May 9, 1939. W. F. STAGGERS 2,157,639
SAFETY HITCH
Filed March 19, 1938 3 Sheets-Sheet 1

William F. Staggers, Inventor

By Lester L. Sargent, Attorney

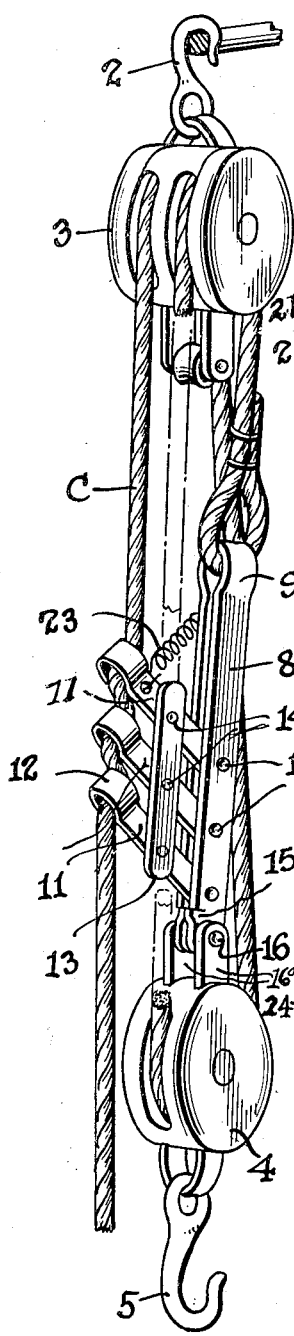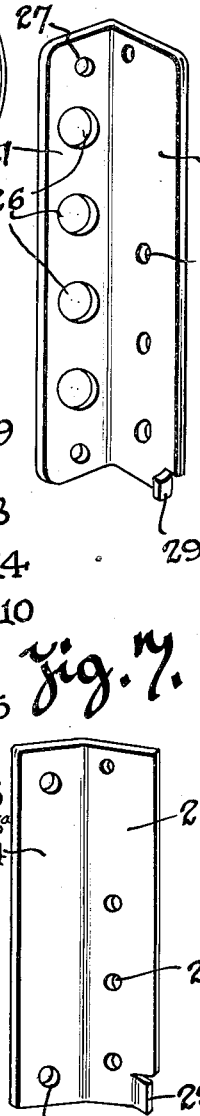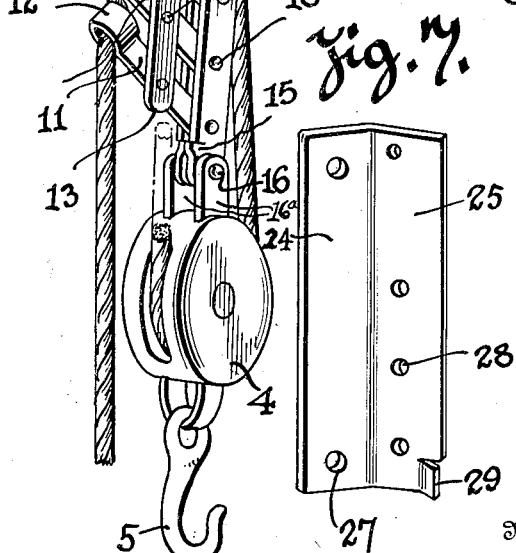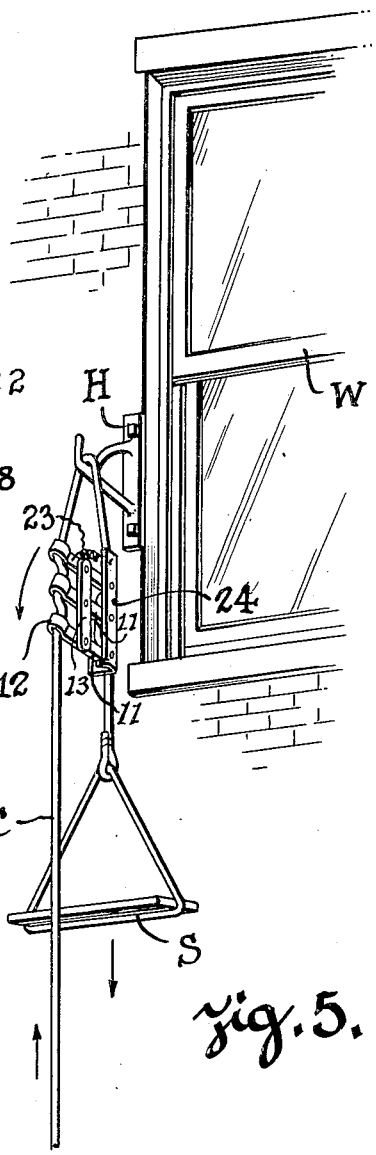

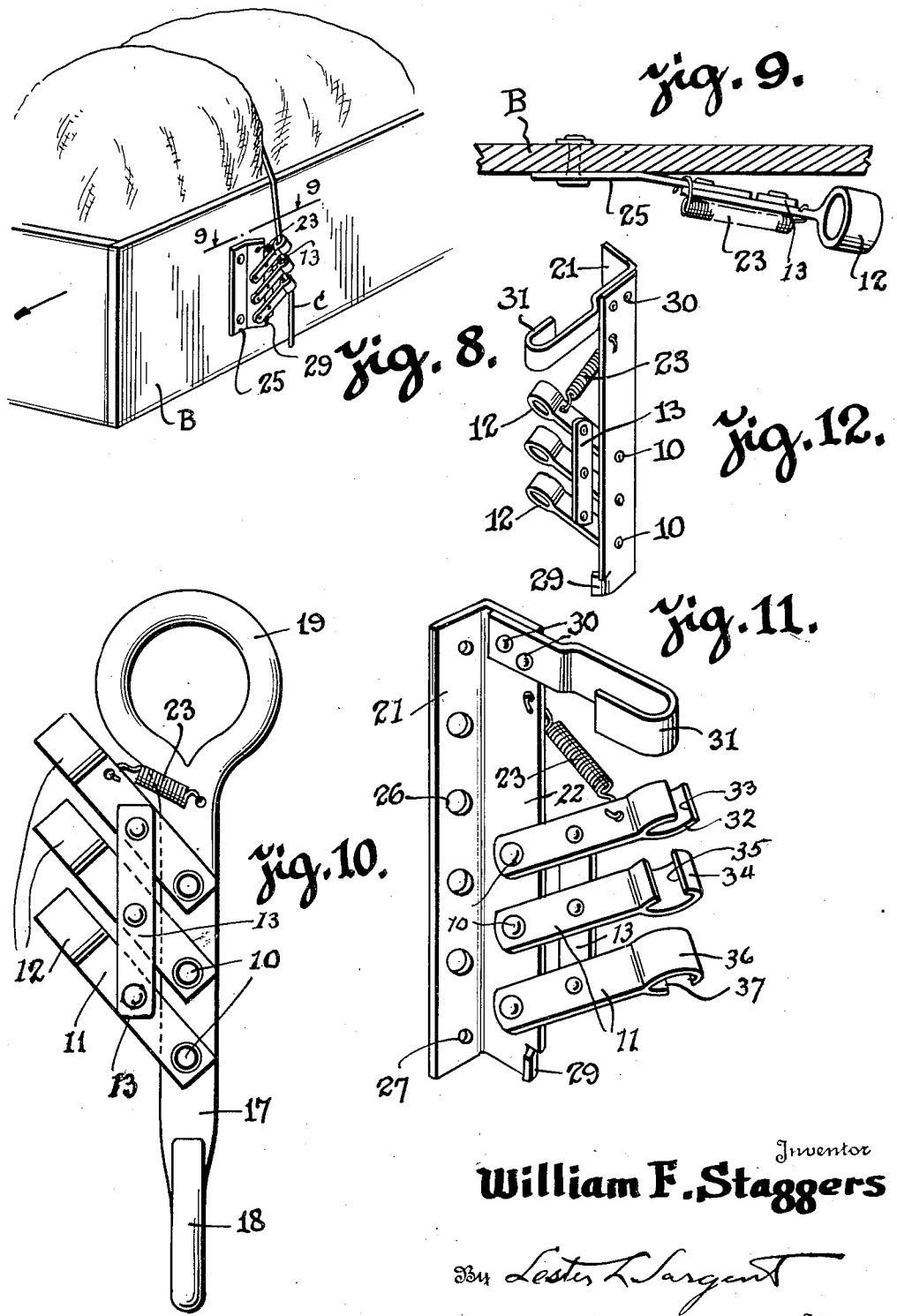

Patented May 9, 1939

2,157,639

UNITED STATES PATENT OFFICE 2,157,639

SAFETY HITCH

William F. Staggers, Mannington, W. Va.

Application March 19, 1938, Serial No. 196,976

7 Claims. (Cl. 24—132)

The object of my invention is to provide certain improvements over the safety hitch disclosed in my Patent No. 2,034,841, patented March 24, 1936.

The main object of my invention is to do away with the formerly man-made hitch which has been the cause of many lives being lost and of many accidents by reason of not being able to secure a safe hitch on cables to hold blocks in their position in scaffold painting, since there has been no other way to hold the block stationary only to take a claw hitch with the running line on the hook that holds the scaffold board. A great many times the hook is not large enough to hold the line in a safe manner, and it has been a great source of worry to men engaged in such work to know whether or not their helper has made a good hitch, especially when they are up to 50 or 75 feet from the ground. It is the purpose of my invention to provide a permanent hitch at all times and all places, and adapted for all manner of work where men are compelled to use a secure hitch on a line.

The object of my invention is a safety hitch for all lines and purposes that a line may be used for, either a single line, double, or on blocks, and most particularly for saffold work, where the fall line or running line is permitted to swing down on the street or sidewalk, and where some innocent party might tamper with it unaware of the danger they might do to the party who is on the scaffold. It is an object of my invention to provide a safety device which is attached to the block right at the hand of the operator and which cannot be released except by the hand of the person on the scaffold. It is also an object of my invention to provide a safety hitch which can be operated easily and safely in the manner hereinafter described.

It is a further object of my invention to provide a safety hitch which can be used on the top block as well as on the bottom block, in the manner illustrated and hereinafter described; and which may be readily adjusted.

It is also an object of my invention to provide a safety hitch device that can be used with a safety belt for men who are working on rigs, derricks, and high tension poles such as electric work, and which can be adjusted to suit the operator making it safe for him to work in dangerous places.

It is a further object of my invention to provide certain improvements in a safety hitch for use in securing and readily adjusting a permanent hitch for clothes lines, fastening guy ropes of tents in a tight position easily by a direct pull on the line, firmly securing ropes attached to canvas coverings of loaded trucks, and securing lines and ropes used in hoisting various articles, and providing a readily operable hitch and brake for use on ropes used for fire escape purposes and for use by painters, linemen, and others, where safety is essential.

I attain these and other objects of my invention by the mechanism illustrated in the accompanying drawings, in which—

Fig. 4 is a perspective view on a larger scale of the form of the invention shown in Fig. 1 of the drawings;

Fig. 5 is a perspective view of the invention applied to a fire escape device;

Fig. 6 is a perspective view of the base plate 24;

Fig. 7 is a perspective view of a modified form of base plate 25 intended primarily for use on trucks;

Fig. 8 is a perspective view of the device having a base plate 25, as illustrated in Fig. 7 and intended for use on trucks;

Fig. 9 is a top plan view of the invention viewed from section line 9—9 of Fig. 8;

Fig. 10 is an enlarged side elevation of the improved form of my device shown in Fig. 2;

Fig. 11 is an enlarged perspective view of an improved form of my device having the bar 31; and Fig. 12 is a perspective view of a form of the device similar to Fig. 11 except that it has loops 12 which are not slotted.

Figures 1, 2:
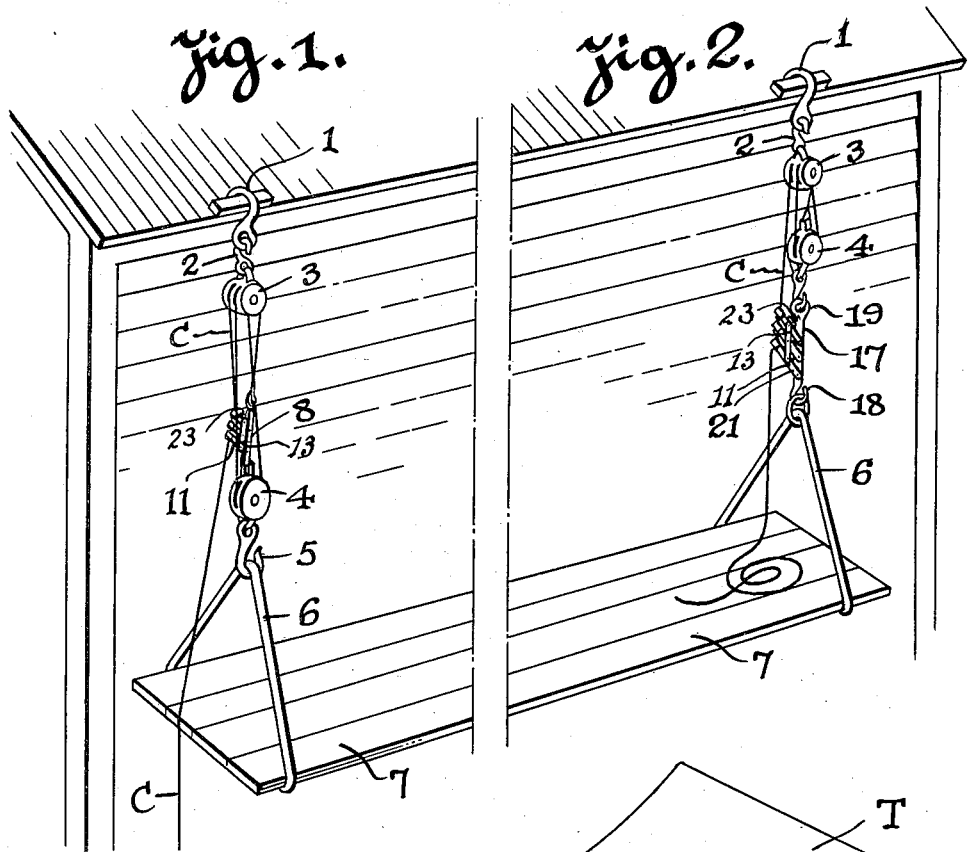
Figure 1 is a perspective view of my invention showing the improved means for attaching it to a conventional lower block of a block and tackle as used in hitching the cables by which a swinging scaffold is suspended for workmen.
Fig. 2 is a similar perspective view of my invention applied to a detachable hook element which can be readily hooked to the depending hook of a conventional lower block of a block and tackle, as used in hitching the cables by which a swinging scaffold is suspended for workmen and also hooked to the scaffold itself.
Figure 3:
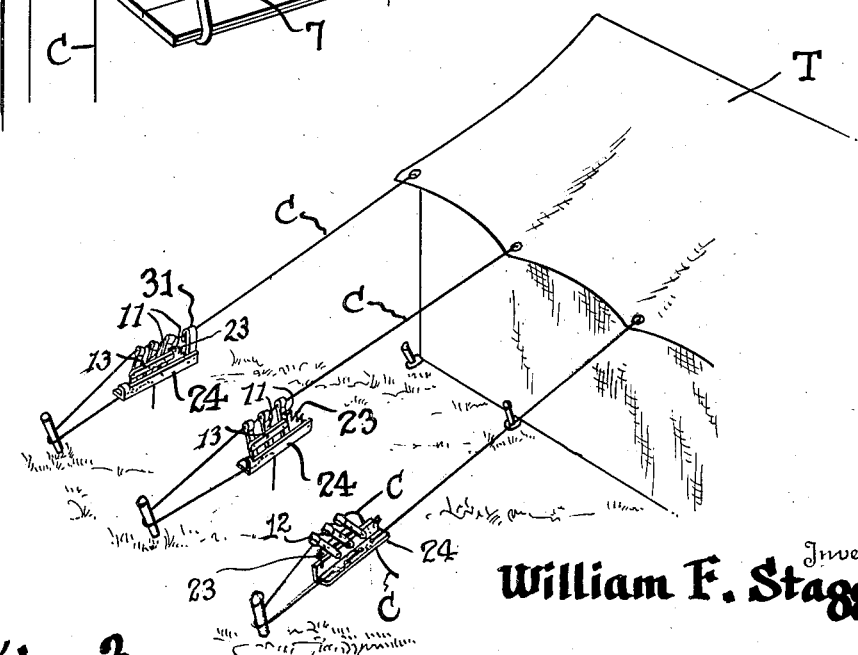
Fig. 3 is a perspective view of two different forms of my invention applied to three of the guy ropes of a tent T, one of the forms being shown applied in two different ways, it being possible to use either form in both ways.

Referring to Figs. 1 and 4, there is illustrated a conventional suspending hook 1 attached to a building to which the hook 2 of a conventional upper block 3 is engaged, and a cable cooperatively connecting upper block 3 with the lower block 4, which has a conventional tackle hook 5 secured to the member 6, which extends around or is attached to a platform 7.

I provide a base comprising a metal bar 8 of any desired shape such as the clevis shown to be attached to the block and having its looped end 9 engaged in a loop of the cable C of the block and tackle and having offset lower ends 15 perforated and engaged by a suitable removable member, as a bolt or pin 16 to the conventional spaced arms 16a of the lower block 4.

Pivotally mounted by bolts or rivets 10 on the clevis or other base member 8 are a series of metal strips 11, preferably three in number, which have loops 12 formed at their free ends of suitable and like size to allow the cable C of any desired size to pass through same, the series of loops 12 functioning as hitches for the cables. These pivoted strips 11 are held in a parallel spaced relation to each other by means of a short bar 13 which is pivotally fastened to the respective strips 11 by suitable pivots 14, as shown in Fig. 4.

I preferably provide a spring 23 attached at one end to the uppermost metal strip 11 and at the other end to the upper end of the base 8 to normally hold the hitches 11 in a position to effect a hitch on the cable.

The mode of operation of the device is illustrated in Figs. 1 and 4, the hitch loops 12 normally being pulled to a hitching or securing position on the cable C by the spring 23. As the strips 11 are connected by the pivotally connected strip 13, they operate in unison. By manually pulling down on any one of the hitch loops, 12, the operator may disengage said loops 12 from the cable to allow it to slide through the hitch loops freely. When released by the operator, the hitch loops are automatically returned to the hitching or securing position by the action of spring 23.

In Figs. 5 and 6 an improved form of the invention is illustrated in which the base plate is an angle plate comprising sides or members 21 and 22 disposed in planes at right angles to each other. The side of the base plate 21 has a series of round spaced slots 26 through which the cable may be threaded back and forth from front to back of the plate to tightly secure the base plate to the cable, as shown in Fig. 6.

The side 22 is provided with small apertures 28 to receive the rivets 10 or other pivot members for mounting the pivoted metal bars 11 on the free ends of which are formed the hitch loops 12.

Side 22 of the base plate has an offset projection 29 which functions as a stop member to limit the extent of possible downward movement of the pivoted metal hitch bars 11.

The method of using this form of the invention is illustrated in Fig. 5. The cable C carrying a seat S is threaded or interwoven back and forth through the successive round slots 26 and is then passed over the supporting hook H and the cable threaded through or engaged in the loops 12 of the operatively connected pivoted metal hitch bars 11. Normally the cable is locked in a stationary position by the hitch loops 12, but the operator may manually release this hitch by pulling down on the loops 12. When he releases his hold on the device, the spring 23 will again operate it to hitch position on the cable.

In Figs. 7 and 8 there is illustrated a modification of the invention in which the base plate has its sides 24 and 25 disposed at an obtuse angle instead of at right angles to each other, so that when the device is attached to a wall or to the body of a truck, the metal hitch bars 11 will lie closely adjacent the body of the truck and not project out from it except to a slight degree, thus avoiding the danger of striking any other vehicle or object. Apertures 27 are for screws or other fastening members by which the side 24 of the plate is fastened to the truck.

Referring to Figs. 2 and 10, there is illustrated a modification of the invention in which the base member is in the form of a hook, the pivoted metal hitch bars 11 being mounted on the body 17 of said hook. This hook has a loop 19 at one end and a hook element 18 at the other end so that it may be used in the manner illustrated in Fig. 2 of the drawings, and be readily attached to a conventional block of a block and tackle.

Referring to Fig. 11, there is illustrated an improved form of my invention designed to permit of operatively engaging the cable in it more quickly than by threading the cable through the loops 12. In this form of the invention, I provide an additional metal strip secured to the upper end of the base plate 22 by bolts or rivets 30 at right angles to said plate and terminating in a loop end 31, open as shown in Fig. 11. I also provide the series of pivoted hitch bars 11.

The uppermost hitch bar has a loop 32 provided with a novel central slot 33, the second bar is provided with a loop 34 having a novel lateral slot 35 and the lower bar is provided with a loop 36 having a novel reversely-disposed lateral slot 37. The cable or rope may be quickly inserted in these successive loops by manually manipulating or bending it to slip it into the loops through the respective slots without the necessity of threading it through closed loops, such as loops 12, which might be inconvenient or impracticable if the cable had a knot tied or a loop formed at its end. This form of the invention makes it possible to operatively connect the cable with the device more quickly than can be done where the cable is threaded through open loops. The member 31 functions as a safety element to prevent the cable from accidentally becoming disengaged from the slotted loops, and is essential for safety where the device is used in connection with scaffolding or fire escape apparatus.

I elect the form shown in Fig. 11 as the preferred form of my invention.

I may provide a modified form of the invention identical with the structure shown in Fig. 11 except that the loops will not have the slots 33, 35, and 37 but will be complete loops as shown in Fig. 12. The bar 31 will, however, be formed with an open slot and will be identical to what is shown in Fig. 11.

Member 31 in either form of the device has an important function in hitching the line or cable from either and preventing it becoming disengaged from the slotted loops of Fig. 11 or slipping through closed loops of Fig. 12, when tension is exerted on the line or cable from any offset or tangent position, at an angle to the bar 31.

What I claim is:

1. In a safety hitch of the type described, the combination of a base, a series of hitch bars pivotally mounted on the base and terminating in slotted loops, the slots of two of the loops being disposed in reverse lateral position from each other, a bar pivotally attached to and operatively connecting the aforesaid bars, and a spring normally securing said bars in a hitching position on a cable.

2. In a safety hitch of the type described, the combination of a base, a series of hitch bars pivotally mounted on the base and terminating in slotted loops, the slots of two of the loops being disposed in reverse lateral position from each other, a short bar pivotally attached to and operatively connecting said bars in spaced relation, a spring resiliently securing said bars in a predetermined hitching position, a fourth bar affixed to the upper end of the base member and disposed at right angles thereto and terminating in an open loop to permit of operatively engaging the cable in the various loops without decreasing the safety of the hitch.

3. In combination with the device defined in claim 2, the base comprising an angle plate on one of the sides of which the hitch bars are pivotally mounted, the other side of the base plate having a series of spaced slots through which the cable or rope may be threaded back and forth to securely attach the base to a cable.

4. In combination with the safety hitch defined in claim 1, the base having an offset projection at its lower end adapted to engage the lowermost of the pivoted hitch bars when it reaches a predetermined position to function as a stop element.

5. In combination with the device defined in claim 2, the base comprising an angle plate on one of the sides of which the hitch bars are pivotally mounted, the other side of the angle plate having a series of spaced round slots through which the cable or rope may be threaded back and forth to securely attach the base to a cable, said angle plate having its sides disposed at an obtuse angle whereby the entire device will lie close to the anchoring member to which the base is affixed.

6. In a safety hitch of the type described, the combination of a base plate having its sides disposed at an angle to each other, a series of hitch bars pivotally connected to the base plate and spaced a like distance from each other, each of said bars terminating in a loop to permit a cable to slide therethrough and to function as a hitch, a bar pivotally connected to each of said bars and spaced from the base, a spring attached to said hitch and to the base to resiliently hold the hitch members in a normal hitching position on the cable, and an integral stop member projecting from the base to prevent movement of the bars outwardly to more than a predetermined degree.

7. In a safety hitch of the type described, the combination of a base, a series of hitch bars pivotally mounted on the base and terminating in loops, a short bar pivotally attached to and operatively connecting said bars in spaced relation, a spring resiliently securing said bars in a predetermined hitching position, a fourth bar affixed to the upper end of the base member and disposed at right angles thereto and terminating in an open loop to permit of operatively engaging the cable in the various loops without decreasing the safety of the hitch.

WILLIAM F. STAGGERS.